United States Patent
Bogusz et al.

(10) Patent No.: US 10,395,339 B2
(45) Date of Patent: Aug. 27, 2019

(54) DATA PROCESSING SYSTEMS

(71) Applicant: ARM Limited, Cambridge (GB)

(72) Inventors: Michal Karol Bogusz, Cambridge (GB); Tomasz Jan Pabis, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/636,890

(22) Filed: Jun. 29, 2017

(65) Prior Publication Data

US 2018/0005351 A1    Jan. 4, 2018

(30) Foreign Application Priority Data

Jun. 29, 2016 (GB) .................................. 1611251.8

(51) Int. Cl.
  *G06T 3/00* (2006.01)
  *G06T 3/40* (2006.01)
  *G06T 7/136* (2017.01)

(52) U.S. Cl.
  CPC ............... *G06T 3/40* (2013.01); *G06T 7/136* (2017.01); *G06T 2207/20021* (2013.01); *G06T 2207/20068* (2013.01)

(58) Field of Classification Search
  CPC . G06T 3/40; G06T 7/136; G06T 2207/20021; G06T 2207/20068
  See application file for complete search history.

(56) References Cited

U.S. PATENT DOCUMENTS

| | | | |
|---|---|---|---|
| 2008/0150966 A1 | 6/2008 | Wang | |
| 2008/0309817 A1 | 12/2008 | Huang | |
| 2011/0221864 A1 | 9/2011 | Filippini et al. | |
| 2012/0120256 A1 | 5/2012 | Hwang et al. | |
| 2013/0223764 A1* | 8/2013 | Tripathi | G06T 3/4007 382/298 |
| 2015/0296175 A1* | 10/2015 | Wallace | G06T 3/40 348/445 |
| 2016/0098812 A1* | 4/2016 | Yoon | G06T 3/4092 345/505 |

OTHER PUBLICATIONS

Combined Search and Examination Report dated Dec. 20, 2016, GB Patent Application GB1611251.8.

* cited by examiner

*Primary Examiner* — Ping Y Hsieh
(74) *Attorney, Agent, or Firm* — Vierra Magen Marcus LLP

(57) ABSTRACT

In a data processing system, an input data array to be downscaled is split into plural parts along its horizontal extent and the different parts of the input data array are then provided to respective scalers of the data processing system and are respectively downscaled by those scalers to provide a plurality of downscaled output parts. The plural downscaled output parts are then combined (merged) to provide the desired downscaled output data array.

18 Claims, 11 Drawing Sheets

DATA PROCESSING SYSTEMS

BACKGROUND

The technology described herein relates to data processing systems, and in particular to the provision of downscaling in data processing systems.

Data processing systems can include a requirement for downscaling input data arrays, e.g. images, to a lower resolution at a particular rate and/or in a particular time period, e.g. in "real time". An example of this is in the case of a data processing system that outputs images for display. In such a system, the, e.g., display controller for the display of the system may need to be able to downscale an input surface (image) that is to be displayed having a first, higher resolution to a lower resolution for display at an appropriate rate for "real time" output (e.g. at a given display update rate, such as 30 or 60 frames per second).

When performing downscaling, more input data must be fetched and processed as compared to the amount of output data that is being generated on the basis of the input data. FIG. 1 illustrates this, and shows that in the case of 2× downscaling in each direction (horizontal and vertical), four times as many input pixels must be fetched and processed as there are output pixels that are to be provided. (In the example shown in FIG. 1, the scaler 11 needs to receive 120 pixels of the input data array 12 in order to compute 30 output pixels of the output data array 13.)

It is known therefore to operate the downscaling process (or at least the input stage of the scaling process) at a higher frequency (at a higher clock frequency) than the frequency at which the downscaled output surface to be provided (e.g. for display). This will then allow more input data to be fetched and scaled in the time required for providing the output data. Accordingly, the downscaling operation may operate in a different clock domain to the output data processing.

However, while operating the downscaling process at a higher frequency than the downscaled output is to be provided for use can facilitate the performance of downscaling in "real time" in data processing systems, the Applicants have recognised that there can still be some downscaling use cases where the scaler clock frequency that would be required is so high that that may not be practically achievable, e.g. in a given data processing system implementation.

The Applicants believe therefore that there remains scope for improvements to the operation of data processing systems, in particular when performing downscaling operations in real time.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
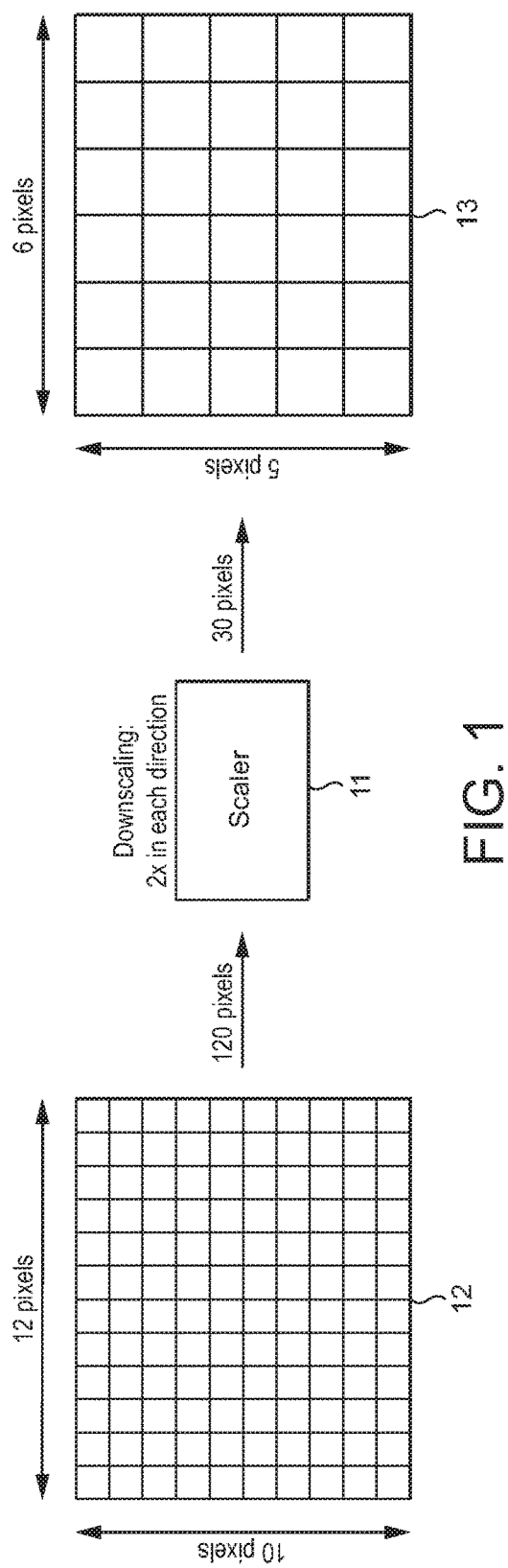
FIG. 1 illustrates the downscaling of a data array.

A first embodiment of the technology described herein comprises a method of operating a data processing system that includes two or more scalers, each scaler being operable to scale a received input data array to provide a scaled output version of the input data array, the method comprising:

when downscaling an input data array to provide an output data array corresponding to a downscaled version of the input data array:

providing a first part of the input data array to be downscaled to one of the scalers for downscaling;

providing a second part of the input data array to be downscaled to another one of the scalers for downscaling;

the scalers downscaling the respective parts of the input data array that they have received to provide respective downscaled versions of the parts of the input data array that they received for downscaling; and combining the downscaled versions of the parts of the input data array from the scalers to provide an output data array corresponding to a downscaled version of the input data array.

A second embodiment of the technology described herein comprises a data processing system, the data processing system comprising:

two or more scalers, each scaler being operable to scale a received input data array to provide a scaled output version of the input data array;

the system further comprising:

processing circuitry configured to, when an input data array is to be downscaled to provide an output data array corresponding to a downscaled version of the input data array:

provide a first part of the input data array to be downscaled to one of the scalers for downscaling; and provide a second part of the input data array to be downscaled to another one of the scalers for downscaling;

the scalers being configured to downscale the respective parts of the input data array that they receive to provide respective downscaled versions of the parts of the input data array that they received for downscaling;

and the system further comprising processing circuitry configured to:

combine the downscaled versions of the parts of the input data array from the scalers to provide an output data array corresponding to a downscaled version of the input data array.

The technology described herein relates to the downscaling of input data arrays for output. However, unlike in existing systems, in the technology described herein, an input data array to be downscaled is divided into plural parts, with each of those parts of the input data array then being downscaled in a respective scaler of the data processing system, and the so-downscaled parts of the input data array then being recombined to provide the desired downscaled output data array.

As will be discussed further below, the Applicants have recognised that this facilitates operating the downscaling process at a lower frequency than may otherwise be required, and can therefore facilitate the use of more advanced and sophisticated downscaling operations in data processing systems that may not otherwise be able to support such operations.

Furthermore, the Applicants have recognised that many data processing systems and data processors will include plural scalers (scaling units). For example, many display controllers contain several scalers (e.g. have a separate scaler for each input layer that they can process). Thus the operation in the manner of the technology described herein may not require any additional hardware in the data processing system, as the necessary plural scalers may already be present in the data processing system. Correspondingly, the technology described herein may be implemented in existing data processing systems that include plural scalers, without the need for significant hardware changes to those existing systems.

The scalers of the data processing system can be any suitable and desired scalers that are operable to scale input data arrays to provide scaled output data arrays. Thus they can be any suitable and desired scaling units, scaling engines, scaling pipelines, etc.

In an embodiment, the scalers that are used to downscale the input data array comprise scalers of a given processing unit (processor) of the overall data processing system. Thus, in an embodiment, the data processing system includes a processor that includes two or more scalers, and the parts of the input data array to be downscaled are provided, respectively, to the scalers of that processor for downscaling. Such a processor can be any suitable and desired processor (processing unit) of a data processing system that includes plural scalers. In an embodiment it is a display controller, a graphics processor (graphics processing unit (GPU)), a video processor (video processing unit (VPU)), or an image signal processor (ISP). In an embodiment it is a display controller (for a display of the data processing system).

The scalers may be implemented as desired, e.g. and in an embodiment, as appropriate processing circuitry (either that is programmable to perform the desired scaling operation, and/or that comprises fixed function scaling circuitry operable to perform the scaling operation).

The data processing system should include plural scalers, but could otherwise include any suitable and desired number of scalers, such as 2 to 10, in an embodiment 4 to 8, scalers. In an embodiment there are 4 scalers.

In an embodiment, the scalers are scalers of the data processing system that would otherwise be present in the data processing system for its intended operation, such as, e.g., existing scalers of a processor of the data processing system, such as of a display controller of the data processing system.

The input data array to be scaled can be any desired and suitable input data array that may need to be processed by the data processing system. The input data array should, and in an embodiment does, comprise an array of data positions (e.g. sample positions) for which respective data values are stored, and should, and in an embodiment does, have a given horizontal and vertical size (in terms of the number of data positions in the horizontal and vertical directions for the input data array).

The input data array can represent any suitable and desired data array, but in an embodiment comprises an image, e.g., and in an embodiment, a frame to be displayed. In an embodiment, the input data array is an input surface (layer), e.g., and in an embodiment, to be processed by a display controller for display.

Correspondingly, the data values for the data positions of the data array can be any suitable and desired data values, e.g., and in an embodiment, depending upon the data array in question. In an embodiment, the data values represent colour values (where the data array is an image, e.g. for display), but they could be other data values for other types of data array, as and if desired.

The input data array is in an embodiment stored in memory, e.g. main memory, of the data processing system for where it is then fetched for processing by the scalers in the appropriate manner.

The input data array can be generated as desired. For example the input data array may be generated by a processing unit of the overall data processing system, such as by being appropriately rendered and stored into a memory (e.g. frame buffer) by a graphics processor of the data processing system. Additionally or alternatively, the input data array may be generated by being appropriately decoded and stored into a memory (e.g. frame buffer) by a video codec (video processor). Additionally or alternatively, one or more input data arrays may be generated by a digital camera image signal processor (ISP), or other image processor. The input data array may be, e.g., for a game, a demo, a graphical user interface (GUI), a GUI with video data (e.g. a video frame with graphics "playback" and "pause" icons), etc.

The scaled (downscaled) output data array that is produced from the input data array will correspondingly comprise an appropriately downscaled version of the input data array. Thus, where the input data array is an image, the output data array will comprise an image comprising a downscaled version of the input data array image.

The downscaling operation that is performed on the parts of the input data array to provide the downscaled output data can comprise any suitable and desired downscaling operation. It in an embodiment comprises the downscaling operation that would otherwise be performed on the input data array to provide the downscaled output data array if the input data array was being downscaled as a whole (in a single scaler) (e.g. the downscaling operation that is required for the data processing operation in question). Thus, the scalers in an embodiment downscale their respective parts of the input data array in (one of) the normal manner that they can operate to downscale input data arrays that they receive for scaling.

In an embodiment, the downscaling operation downscales the input data array in both directions (dimensions), i.e. in both the horizontal and vertical directions. However, the technology described herein is equally applicable to arrangements in which an input data array is only being downscaled in one direction (dimension) (e.g. either horizontally or vertically) (and is either not being scaled or is being upscaled, in the other direction). Thus the downscaling operation that is performed on the input data array may be to downscale the input data array in one or both directions (horizontal and vertical).

The input data array to be downscaled should be divided into at least two parts (that are then provided to two different scalers). However, where more than two scalers are available in the data processing system (e.g. in the processing unit in question), then it would correspondingly be possible to divide the input data array into more than two parts and to distribute those parts to more than two different scalers. It would also be possible to divide an input data array into parts for distribution to less than all the scalers that are available in the data processing system if desired. This will be discussed in more detail below.

An input data array to be downscaled can be divided into plural parts for distribution to different scalers for downscaling in the manner of the technology described herein in any suitable and desired manner. In an embodiment the input data array is divided into respective parts along one of its axes (along one dimension) (with each such part in an embodiment then having the size of the input data array along the other axis (dimension)).

In an embodiment the input data array is divided into respective parts along its horizontal axis, i.e. such that the input data array is divided, in effect, into plural vertical slices that together form the entire input data array. Thus, in an embodiment, each part that the input data array is divided into has the same vertical size (and corresponding to the vertical size of the input data array), but has a horizontal size that is less than the horizontal size of the input data array.

In an embodiment, the input data array is divided into parts that are each the same or substantially similar sizes. Thus, each part that the input data array is divided into in an embodiment has the same vertical size, and the same or substantially similar horizontal size. In an embodiment, the input data array is divided into equally sized parts.

Thus, in an embodiment, the horizontal size of each part that the input data array is divided into comprises or at least is substantially similar to the appropriate fraction of the horizontal size of the input data array. Thus, where there are two scalers being used, each input data array part should comprise (or at least comprise) half the horizontal input size of the input data array. Similarly, where there are N scalers being used, each input data array part in an embodiment has a horizontal size that is (or is at least) 1/N of the horizontal size of the input data array.

Each part that the input data array is divided into and that is distributed to a respective scaler should, and in an embodiment does, comprise a different part of the input data array. The input data array parts could be configured such that there is no overlap between them (i.e. such that each input data array part comprises a completely different part of the input data array) (and in an embodiment, this is what is done).

However, the Applicants have recognised that in some cases a downscaling operation can use a scaling filter (mask) that requires a line or block of data positions to provide a given output data position value. In this case therefore the Applicants have recognised that if the input data array to be downscaled is divided into non-overlapping parts for downscaling in the manner of the technology described herein, then at the adjoining edges of those parts errors may be introduced into the scaling process because data from an adjoining part would, in effect, be required to perform the scaling operation correctly.

Accordingly, in an embodiment, the parts that the input data array is divided into for the purposes of downscaling in the manner of the technology described herein are configured to overlap along their adjoining edges (in an embodiment in terms of a number of data positions across the adjoining edges). The amount of overlap can be selected as desired, and is, e.g., and in an embodiment, selected dependent upon the downscaling process that is being performed (i.e. how many data positions in the relevant (e.g. horizontal) direction will be required to perform the downscaling operation correctly).

Thus, in an embodiment, each part that the input data array is divided into comprises a different part of the input data array, but the respective different parts of the input data array overlap at their adjoining edges, e.g., and in an embodiment, by a number of data positions in the relevant (e.g. horizontal) direction, with the amount of overlap, e.g., and in an embodiment, being based on the downscaling filter that is being used. Thus, where there are N scalers being used, each input data array part in an embodiment has a (horizontal) size that is 1/N of the (horizontal) size of the input data array plus a particular, in an embodiment selected, in an embodiment predefined, amount of "overlap". This will then have the effect of avoiding any artifacts being introduced in the downscaled output data array provided when using the techniques of the technology described herein, as compared to if the input data array was downscaled as a whole (in a single scaler).

The separate parts of the input data array can be provided to the different scalers in any suitable and desired manner. This may e.g., and in an embodiment does, depend upon what functionality for the provision of an input data array to the scalers exists in the data processing system.

In an embodiment, an appropriate subdivision unit (subdivision processing circuitry) divides the input data array into the respective parts and distributes those parts to the respective scalers.

In an embodiment, the provision of the separate parts of the input data array to the scalers is performed by reading those parts in as respective inputs to the scalers from the stored input data array in memory. This may be appropriate where, for example, the data processing system is able to read in respective input arrays (e.g. layers) to its respective scalers for processing (such as may be the case in a display controller).

In this case, each respective part of the input data array to be downscaled can be read in as a respective separate array (e.g. layer) to the, e.g. processing pipeline that includes the, appropriate scaler. Such reading in of separate parts of the input data array to be downscaled as separate arrays (e.g. layers) can be achieved as desired, for example by appropriately configuring the memory pointers and sizes for each of the arrays (layers) to be read in so as to correspond to the appropriate positions and parts of the input data array.

Thus, in an embodiment, the division of the input data array into separate parts and the provision of those separate parts of the input data array to respective scalers is performed by reading each part of the input data array separately from memory (by reading the input data array from memory as two separate arrays (e.g. layers)).

Other arrangements for dividing the input data array into plural parts and for distributing those parts to respective scalers could, of course, be used, if desired.

The combining (merging) of the respective downscaled parts of the input data array to provide the overall, downscaled output data array can correspondingly be done in any suitable and desired manner. For example, a separate combining (merging) unit (processing circuitry) could be provided after the scalers in the relevant component (e.g. processing unit) of the data processing system to merge the downscaled parts together to provide the overall downscaled output data array.

In an embodiment, the combining (merging) of the downscaled parts of the input data array to provide the downscaled output data array is performed by an existing processing unit (processor) of the data processing system that is operable to merge data arrays. For example, a display controller may include a composition stage (composition processing circuitry) that is operable to composite plural input layers (data arrays) to provide an output data array. This compositor could equally be used to merge the downscaled parts of the input data array to provide the overall output downscaled output data array in the technology described herein.

Thus, in an embodiment, the downscaled parts of the input data array output by the scalers are combined to provide the downscaled output data array by a compositor (composition processing circuitry) of the data processing system, e.g., and in an embodiment, by a display compositor of, e.g., a display controller, of the data processing system.

The composition process should be configured to combine the parts output by the scalers appropriately, e.g., and in an embodiment, such that the composition process will treat each of the parts as a separate display layer and is configured to use the appropriate composition size and layer offsets within the composition so as to combine the downscaled parts of the input data array output by the scalers appropriately.

The downscaled output data array can be used as desired. It is in an embodiment provided for further processing in the data processing system, e.g. for further processing by one or more processors of the data processing system. In an embodiment, the downscaled output surface is provided to a display for display. This may particularly be the case where the downscaling and combining operation is being performed in a display controller of the data processing system.

As well as or instead of being output for display, the downscaled output surface can otherwise be provided (output) for use as desired. Thus it may, for example, be written out to memory from where it may then be used for further processing. Thus in an embodiment, the downscaled output data array is written to memory of the data processing system (e.g. as well as, or instead of, being displayed).

While it would be possible for the downscaled output data array to form the entire output data array, e.g. image, that is output (e.g. displayed) (and in an embodiment this is the case), the Applicants have recognised that there could be situations where it is desired to combine the downscaled output data array with further data arrays to provide an overall output data array. This could be the case, for example, where the downscaled input data array is to be composited with other data arrays (surfaces), e.g. for display. Thus, in an embodiment, the technology described herein further comprises combining the output data array that corresponds to a downscaled version of the input data array with one or more further data arrays to provide an overall output data array. In these arrangements, the output data array corresponding to the downscaled version of the input data array can be combined with a further data array or arrays in any suitable and desired manner, e.g. according to the desired data array composition process. The further data arrays may themselves be downscaled in the manner of the technology described herein, if and as desired (or may be upscaled, or not scaled at all).

While it would be possible simply to always divide an input data array to be downscaled into different parts and to distribute those parts to different scalers for processing in the manner of the technology described herein, the Applicants have recognised that this may not always be desirable or need to be the case. For example, for some input data arrays and/or downscaling operations, it may be possible to downscale the entire input data array at a desired rate using a single scaler. In that case, it may be unnecessary to distribute the input data array to plural scalers for downscaling (and undesirable to do so, as enabling more scaling resources could consume more power).

Thus, in an embodiment, it is determined for an input data array to be downscaled, whether the input data array can be downscaled using a single scaler, or whether it should be downscaled using plural scalers in the manner of the technology described herein.

This determination can be performed in any desired and suitable manner. In an embodiment it is based on one or more particular, in an embodiment selected, in an embodiment predefined, criteria, that are to be used to determine whether to downscale an input data array using a single scaler, or to divide it into parts and to downscale it using plural scalers.

The determination can be based on any suitable and desired criteria.

In an embodiment, this determination is based on the amount (level) of downscaling that is required (that is to be performed). It is in an embodiment also or instead (and in an embodiment also) based on the frequency at which the output array data is required to be produced for output (in an embodiment in terms of the frequency at which each data position for the output data array will be or needs to be produced and/or provided for use).

In an embodiment, the level (amount) of downscaling that is required is determined based on the size of the input data array to be downscaled (in an embodiment in terms of both its horizontal and vertical size), and the size of the output data array that is to be produced (and in an embodiment as the ratio of the size of the input data array to be downscaled to the size of the output data array that is to be produced).

In an embodiment the frequency at which a single scaler would be required to operate to downscale the input data array is determined as being the size of the input data array divided by the size for the output data array, multiplied by the frequency at which the output data array data is required to be produced for output.

The size of the input data array is in an embodiment determined as being the horizontal size of the input data array multiplied by the vertical size of the input data array. The size of the output data array is in an embodiment determined as being the total horizontal size of the output data array (which may be the horizontal size of the downscaled output data array, or is (in an embodiment) the total horizontal size required for the output data array where that differs from the size of the downscaled output data array in that direction (e.g. the total (horizontal) size of the (and each) display timing line in the case of output for display) multiplied by the vertical size of the output data array.

Thus, in an embodiment, the determination of whether an input data array can be downscaled using a single scaler, or whether it should be downscaled using plural scalers in the manner of the technology described herein is based on at least one of, and in an embodiment plural of, and in an embodiment each of: the size of the input data array (in an embodiment in terms of both its horizontal and vertical size); the size of the output data array (in an embodiment at least in terms of the vertical size of the scaled output data array); and the frequency at which the output data array data is required to be produced for output (in an embodiment in terms of the frequency at which each data position for the output data array will be or needs to be produced and/or used).

The determination in an embodiment considers the total output size that is required for when outputting the output data array (at least in the horizontal direction), at least where that differs from the size of the output data array in that direction (e.g. in the horizontal direction).

In an embodiment one or more, and in an embodiment all, of these parameters are used to derive an effective frequency at which the downscaling operation must operate, and that effective frequency is then compared to the frequency at which the scalers in the data processing system can operate at, and if that frequency is less than or equal to the frequency that a single scaler can operate at, then the input data array is processed using a single scaler, but if that frequency is greater than the frequency at which a single scaler can operate, the input data array is divided into plural parts and distributed to plural scalers for processing.

In the latter case, it is in an embodiment determined how many scalers are required to reduce the scaler operating frequency to less than or equal to a threshold scaler frequency (which threshold may, e.g., and in an embodiment, correspond to the maximum frequency at which a scaler can be operated (which maximum frequency may be limited, e.g., by the physical implementation of the scaler)), and then the input data array is divided into a number of parts corresponding to that number of scalers and distributed to that number of scalers. It would also be possible to divide an input data array into more parts and distribute it to more scalers than the minimum number of scalers required to achieve a suitable scaler operation frequency if desired (and if suitable scaling resources are available).

In the case where it is determined that the input data array should be distributed to plural scalers, then the frequency that each of those plural scalers will be required to operate at when downscaling the input data array may be determined as desired. It is in an embodiment determined by dividing the frequency required if using a single scaler by the number of different scalers that the input data array will be distributed to for downscaling.

Correspondingly, in an embodiment, the frequency at which each scaler of a set of plural scalers being used to downscale an input data array will be required to operate at is in an embodiment determined based on the size of each input data array part that a given scaler will be required to process, the size of the output data array, and the frequency at which the output data array data is required to be produced for output.

The size of the input data array part that each scaler will be required to process is in an embodiment determined by dividing the overall size of the input data array (in the direction that it is going to be divided into parts along (thus, e.g., and in an embodiment, the horizontal direction) by the total number of scalers (parts) that will be used, and then multiplying that size by the size of the input data array in the other (e.g., and in an embodiment, vertical) direction.

In an embodiment the input data array part size is then divided by the total size of the output data array with the result of that division being multiplied by the frequency at which the output data array data is required to be produced to then give the frequency at which each individual scaler will be required to operate at.

In arrangements where the parts that the input data array is divided into are configured to overlap along their adjoining edges, then in an embodiment the amount of overlap is taken into account when considering the frequency at which the scalers will need to operate at to downscale the input data array (as the overlap will increase the size of the parts that each scaler needs to downscale).

This may be done as desired, but is in an embodiment done by effectively increasing the size of the input data array when calculating the scaler frequency by the overall amount of overlap that will be present. Thus, the, e.g. horizontal, size of each part of the input data array that the input data array will be divided into is in an embodiment determined as being the overall, e.g. horizontal, size of the input data array plus N−1 times the overlap size (where N is the number of parts that the input data array is to be divided into) divided by the number of parts that the data array is to be divided into. (Correspondingly, where "overlap" is being used and considered, the overall size of the input data array in the (e.g. horizontal) direction that it is being sub-divided along is in an embodiment determined as being the overall size of the input data array in that (e.g. horizontal) direction plus N−1 times the overlap size (where N is the number of parts that the input data array is to be divided into).)

In these arrangements, if it is determined that there are insufficient scalers to be able to downscale the input data array at the desired frequency, then some form of error or other operation is in an embodiment performed. For example, some or all of the scaling could be done in a different unit of the data processing system that does not need to return the scaled data so fast (e.g. that can prepare several data arrays at the same time and so has an effectively longer period in which to scale the input data array as a result) and/or that can work at a higher frequency.

In an embodiment, it is also (and first) determined what scaling resources (how many scalers) are available for downscaling the input data array.

The Applicants have recognised in this regard that while a given data processing system (e.g. display controller of a data processing system) may have a certain number of scalers, it could be the case that not all of those scalers will be available for downscaling an input data array, e.g., depending upon what other scaling operations may be required for producing the overall output in question. For example, where the downscaled input data array is to be combined with other data arrays to perform an overall output data array, it could be the case that one or more of those other input data arrays that are to form the overall output data array will also require scaling. The scaling resources (scalers) required for processing the other input data arrays would accordingly not be available for downscaling the input data array that is to be downscaled.

Thus, in an embodiment, rather than simply assuming that all of the scalers are available for downscaling an input data array, it is first determined what scaling resources (how many scalers) are available for downscaling the input data array to be downscaled, and then the appropriate number of those available scalers is selected for downscaling the input data array (or, as discussed above, some form of error or other operation is performed if the available number of scalers is not sufficient for downscaling the input data array).

It would also correspondingly be possible to downscale two or more input data arrays in the manner of the technology described herein that are then to be combined to produce an overall output data array. In this case, each of the input data arrays would be distributed to and downscaled in a different set of plural scalers of the overall set of scalers available in the data processing system.

Thus, in an embodiment, the technology described herein comprises downscaling plural input data arrays in the manner of the technology described herein, and then combining the plural downscaled input data arrays to provide an overall output data array. The combining operation in this regard could combine the respective downscaled parts of each input data array to provide an output data array corresponding to a downscaled version of the input data array before then further combining the respective output data arrays, or all of the parts of the different input data arrays could be combined in a single combining operation to provide the overall output data array.

The determination of whether to divide an input data array to be downscaled into plural parts that are to be distributed to plural scalers of the data processing system (and, e.g., of the available scaling resources) can be performed by any suitable and desired component or element of the overall data processing system.

In an embodiment, this is done by the driver for the processor that the scalers are part of. Thus in the case where the scalers and the scaling operation is being performed by a display controller, in an embodiment the driver for the display controller (that may e.g., be executing on a host CPU of the data processing system) in an embodiment determines whether an input data array should be divided into parts and distributed to plural scalers of the display controller, as appropriate. In this case, the driver in an embodiment also configures the input data array and/or its fetching from memory such that the data array will be appropriately divided into parts that are then scaled by respective scalers of the, e.g., display controller, in the desired manner.

In an embodiment, the determination element, e.g. driver, is able to analyse and/or has knowledge of the scaling resources that are available (e.g. in the display controller) and the available operating frequency (e.g. clock frequency) of those scaler resources, and the frequency (rate) that the downscaled output frame will be required to be produced at, and then makes the determination of whether or not, and how to, partition the input data array into plural parts for downscaling, appropriately. Thus, the determination element, e.g. driver, is in an embodiment provided with the appropriate information that it requires for making the determination of whether (and if so, how) to divide an input data array to be downscaled into plural parts and to then distribute those parts to plural scalers for downscaling.

The technology described herein is applicable to and can be used in any situation in a data processing system where an input data array is to be downscaled, and where the data processing system includes plural scalers that are able to perform that downscaling operation. As will be appreciated from the above, it is particularly applicable for situations where the downscaled output version of the input data array must be provided so as to meet particular time constraints, such as being able to provide output data positions of the downscaled output data array at a particular rate (frequency).

Correspondingly, the technology described herein is applicable to and can be used in any element or component of a data processing system that includes plural scalers each operable to downscale a received input data array to provide an output data array comprising a downscaled version of an input data array.

This said, and as will be appreciated from the above, the Applicants believe that the technology described herein will have particular application to the operation of display controllers and in particular to such operation when downscaling an input data array for display. The Applicants have recognised in this regard that display controller operation is usually an operation that is required to provide an output data array for display so as to meet particular timing requirements (e.g., and in an embodiment, a frequency at which output pixels of an output data array to be displayed are output), and, moreover, that (modern) display controllers will typically include plural scalers, such that they can be operated in the manner of the technology described herein with little or no modification.

Thus, in an embodiment, the data processing system includes a display controller that comprises a memory read sub-system operable to fetch data of input surfaces to be processed by the display controller from memory, an input surface processing stage operable to process fetched data of input surfaces to provide one or more output surfaces, the input surface processing stage including plural scalers, each scaler operable to scale a received input surface to provide a scaled output version of the input surface, and a composition stage operable to composite output surfaces output by the input surface processing stage to provide a composited output surface, and the display controller downscales and combines the input data array.

Correspondingly, an embodiment of the technology described herein comprises a method of operating a display controller of a data processing system, which display controller comprises:

a memory read sub-system operable to fetch data of input surfaces to be processed by the display controller from memory;

an input surface processing stage operable to process fetched data of input surfaces to provide one or more output surfaces, the input surface processing stage including plural scalers, each scaler operable to scale a received input surface to provide a scaled output version of the input surface; and a composition stage operable to composite output surfaces output by the input surface processing stage to provide a composited output surface;

the method comprising:

when downscaling an input surface to provide an output surface corresponding to a downscaled version of the input surface:

providing a first part of the input surface to be downscaled to one of the scalers of the input surface processing stage for downscaling;

providing a second part of the input surface to be downscaled to another one of the scalers of the input surface processing stage for downscaling;

the scalers downscaling the respective parts of the input surface that they receive to provide respective downscaled versions of the parts of the input surface that they received for downscaling; and the composition stage combining the downscaled versions of the parts of the input surface from the scalers to provide an output surface corresponding to a downscaled version of the input surface.

Another embodiment of the technology described herein comprises a display controller for a data processing system, the display controller comprising:

a memory read sub-system operable to fetch data of input surfaces to be processed by the display controller from memory;

an input surface processing stage operable to process fetched data of input surfaces to provide one or more output surfaces, the input surface processing stage including plural scalers, each scaler operable to scale a received input surface to provide a scaled output version of the input surface; and a composition stage operable to composite output surfaces output by the input surface processing stage to provide a composited output surface;

the display controller further comprising:

processing circuitry operable to, when an input surface is to be downscaled to provide an output surface corresponding to a downscaled version of the input surface:

provide a first part of the input surface to be downscaled to one of the scalers of the input surface processing stage for downscaling;

provide a second part of the input surface to be downscaled to another one of the scalers of the input surface processing stage for downscaling;

the scalers being operable to downscale the respective parts of the input surface that they receive to provide respective downscaled versions of the parts of the input surface that they received for downscaling; and the composition stage being operable to combine the downscaled versions of the parts of the input surface from the scalers to provide an output surface corresponding to a downscaled version of the input surface.

As will be appreciated by those skilled in the art, the technology described herein can, and in an embodiment does, include any one or more or all of the embodiments and features of the technology described herein described herein, as appropriate.

The memory read subsystem of the display controller can function as desired and include any suitable and desired elements and components of such subsystems, such as, for example, and in an embodiment, appropriate local latency hiding buffers, a Direct Memory Access (DMA) read controller, etc.

As well as including scaling functionality, the display controller input surface processing stage operable to process plural read (fetched) input surfaces to generate respective output surfaces can perform any other desired processing on the input surface(s), such as decoding, rotation, pixel processing functions, etc.

In an embodiment, the input surface processing stage includes one or more layer pipelines, each operable to perform one or more processing operations on an input surface, as appropriate, e.g. before providing the one processed input surface to a scaling stage and/or composition stage, or otherwise. The display controller can in an embodiment handle plural input layers and has plural layer pipelines, such as a video layer pipeline or pipelines, a graphics layer pipeline, etc. These layer pipelines may be operable, for example, to provide pixel processing functions such as pixel unpacking, colour conversion, (inverse) gamma correction, and the like.

The scalers of the input surface processing stage of the display controller can be provided as desired. Thus they may, for example, be part of the (respective) layer pipelines. In an embodiment, the scalers are provided as a separate unit or units of the display controller that can be accessed by and used for the input surface processing stage (and other stages and operations of the display controller operation) as and when required.

The display controller in an embodiment also includes a post-processing pipeline operable to perform one or more processing operations on one or more surfaces (and in an embodiment on the output surface output by the composition stage), e.g. to generate a post-processed surface. This post-processing may comprise, for example, colour conversion, dithering, and/or gamma correction.

The display controller may provide a processed input surface or surfaces for display in any suitable and desired manner. In an embodiment it comprises an output stage for this purpose. Thus, in an embodiment, the display controller comprises an output stage operable to provide an output surface for display to a display.

The output stage of the display controller may be any suitable output stage operable to provide an output surface for display to a display, e.g. to cause the output surface for display to be displayed on the display. The output stage in an embodiment comprises a display processing pipeline that performs any necessary display processing operations on the output surface to be displayed. The output stage in an embodiment comprises appropriate timing control functionality (e.g. it is configured to send pixel data to the display with appropriate horizontal and vertical blanking periods), for the display.

In an embodiment, the display controller further comprises a write-out stage operable to write an output surface to external memory. This will allow the display controller to, e.g., (selectively) write-out an output surface to external memory (such as a frame buffer), e.g. at the same time as an output surface is being displayed on the display.

The various stages of the display controller may be implemented as desired, e.g. in the form of one or more fixed function units (hardware) (i.e. that is dedicated to one or more functions that cannot be changed), and/or as one or more programmable processing stages, e.g. by means of programmable circuitry that can be programmed to perform the desired operation. There may be both fixed function and programmable stages.

One or more of the various stages may be provided as separate circuit elements to one another. Additionally or alternatively, some or all of the stages may be at least partially formed of (provided by) shared circuitry.

It would also be possible for the display controller to comprise, e.g., two (or more) display processing cores, each configured in the manner discussed above, if desired.

As well as including the necessary scalers, processing circuitry, etc., in order to be able to operate in the manner of the technology described herein, the data processing system of the technology described herein can otherwise include any one or more or other components that such data processing systems can and/or normally comprise.

Thus, the data processing system may and in an embodiment does also comprise one or more of, and in an embodiment all of: a central processing unit, a graphics processing unit, a video processor (codec), a display controller, a system bus, and a memory controller.

The data processing system (and/or display controller) may be, and in an embodiment is, configured to communicate with one or more of (and the technology described herein also extends to an arrangement comprising one or more of): an external memory (e.g. via a memory controller), one or more local displays, and/or one or more external displays. The external memory in an embodiment comprises a main memory (e.g. that is shared with the central processing unit (CPU)) of the overall data processing system.

The display may be any suitable and desired display, such as for example, a screen. It may comprise the overall data processing system's (device's) local display (screen) and/or an external display. There may be more than one display output, if desired.

Thus, in some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

Correspondingly, an embodiment of the technology described herein comprises a data processing system comprising:

a main memory;

a display;

one or more processing units operable to generate input surfaces for display and to store the input surfaces in the main memory; and a display controller, the display controller comprising:

a memory read sub-system operable to fetch data of input surfaces to be processed by the display controller from memory;

an input surface processing stage operable to process fetched data of input surfaces to provide one or more output surfaces, the input surface processing stage including plural scalers, each scaler operable to scale a received input surface to provide a scaled output version of the input surface; and a composition stage operable to composite output surfaces output by the input surface processing stage to provide a composited output surface;

the display controller further comprising:

processing circuitry operable to, when an input surface is to be downscaled to provide an output surface corresponding to a downscaled version of the input surface:

provide a first part of the input surface to be downscaled to one of the scalers of the input surface processing stage for downscaling;

provide a second part of the input surface to be downscaled to another one of the scalers of the input surface processing stage for downscaling;

the scalers being operable to downscale the respective parts of the input surface that they receive to provide respective downscaled versions of the parts of the input surface that they received for downscaling; and the composition stage being operable to combine the downscaled versions of the parts of the input surface from the scalers to provide an output surface corresponding to a downscaled version of the input surface.

As will be appreciated by those skilled in the art, the technology described herein can and in an embodiment does include one or more, and in an embodiment all, of the embodiments and features described herein.

The operation in the manner of the technology described herein is in an embodiment repeated for plural output data arrays to be generated, e.g., and in an embodiment, for a sequence of frames to be displayed.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may comprise a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the components of the data processing system, such as the display controller, can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that in an embodiment the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus in an embodiment the technology described herein comprises computer software and such software installed on a computer software carrier for carrying out at least one of the steps of the methods set out herein.

The technology described herein should (an in an embodiment does) produce some useful output data e.g. an array of image data for display of an image.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described. The present embodiments will be described in the context of performing a downscaling operation in a display controller of a data processing system, but as discussed above, the principles and operation of the present embodiments can equally apply to other elements and components of a data processing system where downscaling may be performed or need to be performed.

Figure 2:
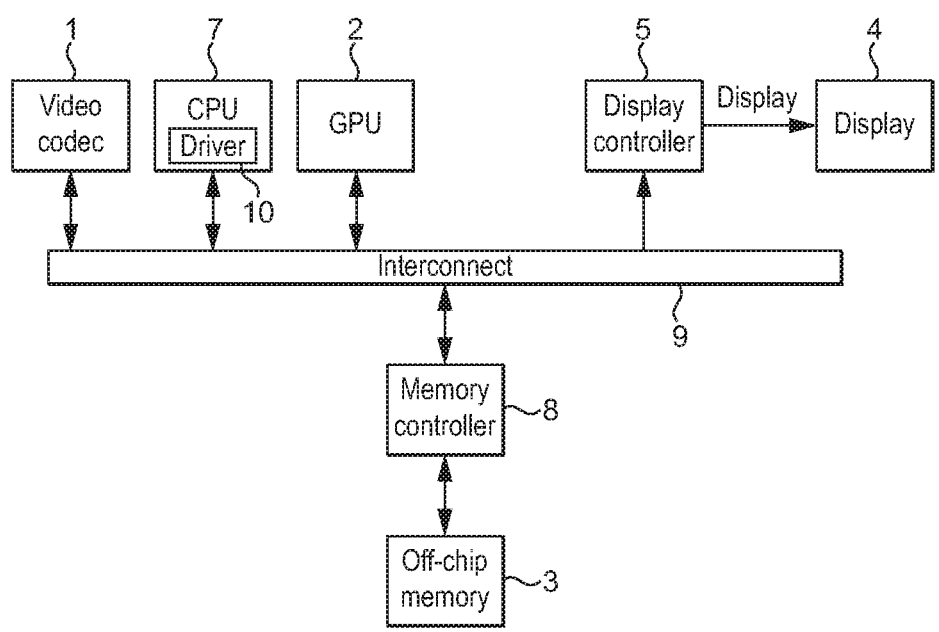
FIG. 2 shows an exemplary data processing system.

FIG. 2 shows an exemplary data processing system that comprises a central processing unit (CPU) 7, a graphics processing unit (GPU) 2, a video codec 1, a display controller 5, and a memory controller 8. As shown in FIG. 1, these units communicate via an interconnect 9 and have access to off-chip memory 3. In use of this system the GPU 2, video codec 1 and/or CPU 7 will generate surfaces (images) to be displayed and store them, via the memory controller 8, in respective frame buffers in the off-chip memory 3. The display controller 5 will then read those surfaces as input layers from the frame buffers in the off-chip memory 3 via the memory controller 8, process the input surfaces appropriately and send them to a display 4 for display.

As shown in FIG. 2, the CPU 7, inter alia, executes a driver 10 for the display controller 5.

Figure 3:
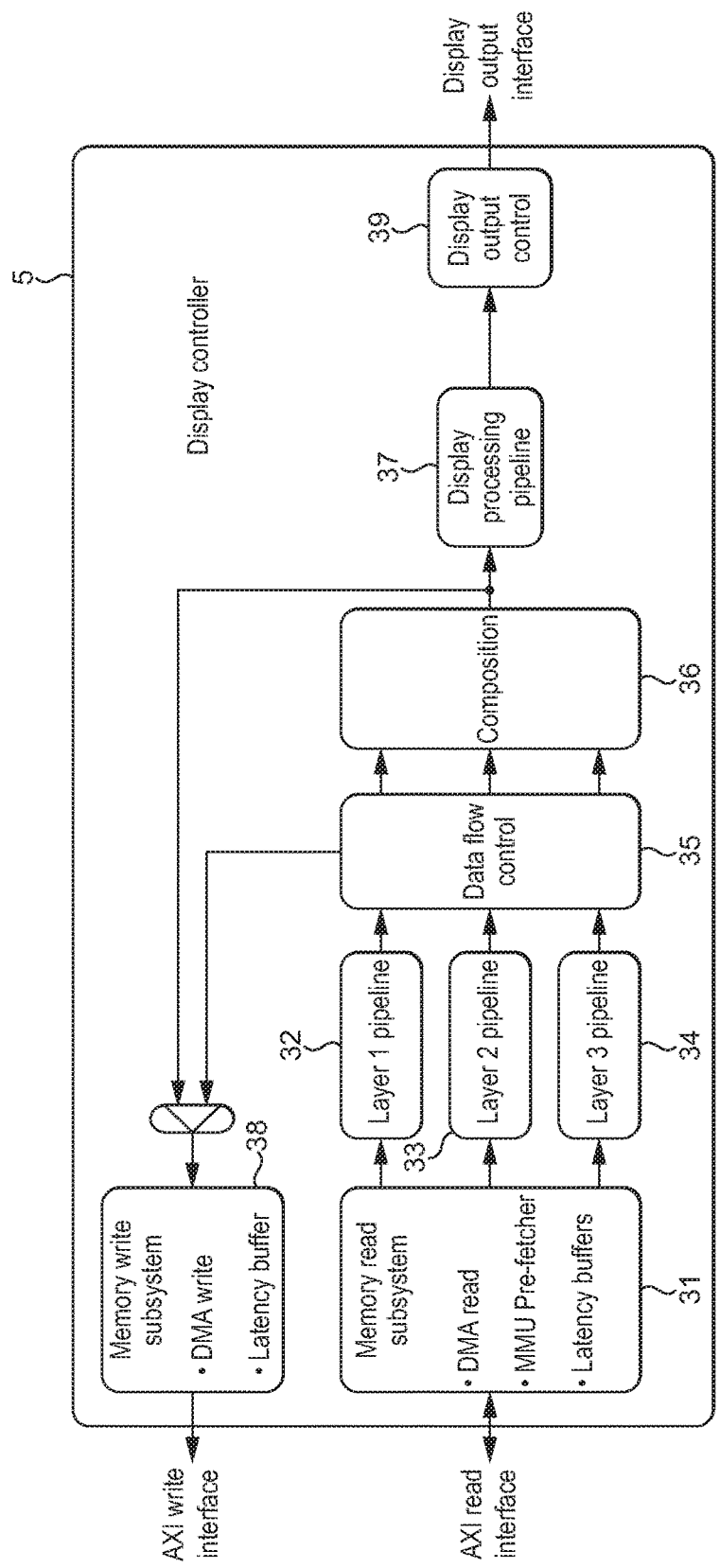
FIG. 3 shows schematically a display controller that can be operated in accordance with an embodiment of the technology described herein.

FIG. 3 shows schematically the display controller 5 in more detail. In FIG. 3, the boxes represent functional units of the display controller, while the arrowed lines represent connections between the various functional units.

As shown in FIG. 3, the display controller 5 comprises a memory read subsystem 31 that includes, inter alia, a read controller in the form of a Direct Memory Access (DMA) read controller. The read controller is configured to read one or more input surfaces from one or more frame buffers in the main memory 3 (not shown in FIG. 3) via the memory bus 9.

The memory read subsystem 31 further comprises one or more real-time FIFO (first-in-first-out) modules which are used to buffer locally the one or more input surfaces as they are read from memory, e.g. for latency hiding purposes.

In this embodiment, the memory read subsystem 31 is configured to provide (read) up to three different input surfaces for use as input layers which are to be used to generate a composited output frame. The three input layers may comprise one or more video layers, e.g. generated by the video processor (codec) 1, and one or more graphics layers, e.g. graphics windows generated by the graphics processing unit (GPU) 2, and so on. Hence, FIG. 3 shows the display controller 5 comprising three layer pipelines 32, 33, 34 which will each receive data from an input surface to be used as a display layer. Any or all of the input surfaces received by the layer pipelines may have been subjected to decoding by a decoder and/or rotation by a rotation unit, if desired.

Each layer pipeline 32, 33, 34 performs appropriate operations on the received surfaces, such as pixel unpacking from the received data words, colour (e.g. YUV to RGB) conversion, and inverse gamma or inverse sRGB correction.

Although the embodiment of FIG. 3 illustrates the use of three layer pipelines (and therefore up to three input layers), it will be appreciated that any number of layer pipelines may be provided and used in the technology described herein, depending on the application in question (and also depending on any silicon area constraints, etc.).

The layer processing pipelines 32, 33, 34 act as a processing stage of the display controller 5 that takes data of input surfaces read by the memory read subsystem 31 and produces from that data output surfaces, e.g. for display.

The display controller 5 further comprises a composition unit (display compositor) 36 that can receive inputs from the layer pipelines 32, 33, 34 and operates to compose the received input layers to generate a composited output surface, e.g. by appropriate alpha blending operations, etc.

The composited output frames from the composition unit 36 are onwardly transmitted to a display processing (post-processing) pipeline 37 for display, and/or to a memory write sub-system 38, as desired.

The display pipeline 37 is configured to selectively carry out any desired processing operation(s) on the composited output surface (frame), and to then transmit the (processed) composited output frame for appropriate display on the associated display.

The display processing pipeline 37 may, for example, comprise a colour conversion stage operable to apply a colour conversion to the composited output frame, a dithering stage operable to apply dithering to the composited output frame, and/or a gamma correction stage operable to carry out gamma correction on the composited output frame.

The display processing pipeline 37 also comprises appropriate display timing functionality. Thus, the display processing pipeline 37 is configured to send pixel data to the display outputs 39 with e.g. appropriate horizontal and vertical blanking periods. For example, horizontal and vertical synchronization pulses (HSYNC, VSYNC) may be generated together with a DATAEN signal which is asserted in non-blanking periods. In blanking periods DATAEN is de-asserted and no data is sent to the display (there are 4 blanking periods: horizontal front porch—before the HSYNC pulse, horizontal back porch—after the HSYNC pulse, vertical front porch—before the VSYNC pulse, and vertical back porch—after the VSYNC pulse).

It would also be possible to use other display timing and data (pixel) packing schemes, such as MIPI DPI, HDMI, Display Port, etc., if desired.

The display output 39 may, e.g. interface with a local display of the data processing system (e.g. of the mobile device, smart phone, tablet, etc., that the data processing system is part of).

The display processing pipeline 37 and display output control interface 39 accordingly act as an output stage for the display controller 5 for providing output surfaces for display to the display 4.

The memory write subsystem 38 of the display controller 5 is operable to write surfaces, e.g. generated by the composition unit 36, that it receives, out to external memory 3 (a frame buffer in external memory 3) via a memory bus. This then allows the display controller 5 to, as well as providing output frames for display, also write those output frames to main memory, if desired. To facilitate this operation, the memory write subsystem 38 includes a DMA write controller. In the present embodiment it also comprises appropriate FIFOs to act as latency hiding buffers.

The display controller 5 also includes a data flow control module 35 that is operable to direct the data flows through the display controller, i.e. to provide the input layers, composited output surfaces, etc., to the appropriate units for processing as shown in FIG. 3. In the present embodiment, the data flow controller 35 operates under appropriate software control, e.g., and in an embodiment, from a driver 10 for the display controller that is running on a host processor (e.g. the CPU 7) of the overall data processing system that the display controller 5 is part of. The driver may generate appropriate commands for the data flow controller 35 and program control registers of the display controller 5 in response to, e.g., commands and data for display processing received from an application running on the host processor.

Other arrangements in this regard, would, of course, be possible.

As discussed above, when the display controller 5 is to provide an output frame for display, it will read in data of one or more input surfaces that have been generated, e.g., by video codec 1 and/or GPU 2, and which are stored in respective frame buffers in the main memory 3, to act as input layers in its output surface generation process, process that input surface data (e.g. by compositing it into an output frame) and provide the (composited) output frame to the display 4 for display via the display processing pipeline 37.

This process is repeated for each frame that needs to be displayed, e.g. at a rate of 30 or 60 frames per second.

As such display processing is a real-time operation, the display controller 5 needs to deliver the pixel data to be displayed to the display 4 (to the display output) regularly, in each clock cycle triggering the display output from the display controller.

As well as the functionality discussed above, in the present embodiments, the display controller 5 includes scaling functionality (scalers) in each of its input layer pipelines 32, 33, 34 and in the output, display processing pipeline 37.

Figure 4:
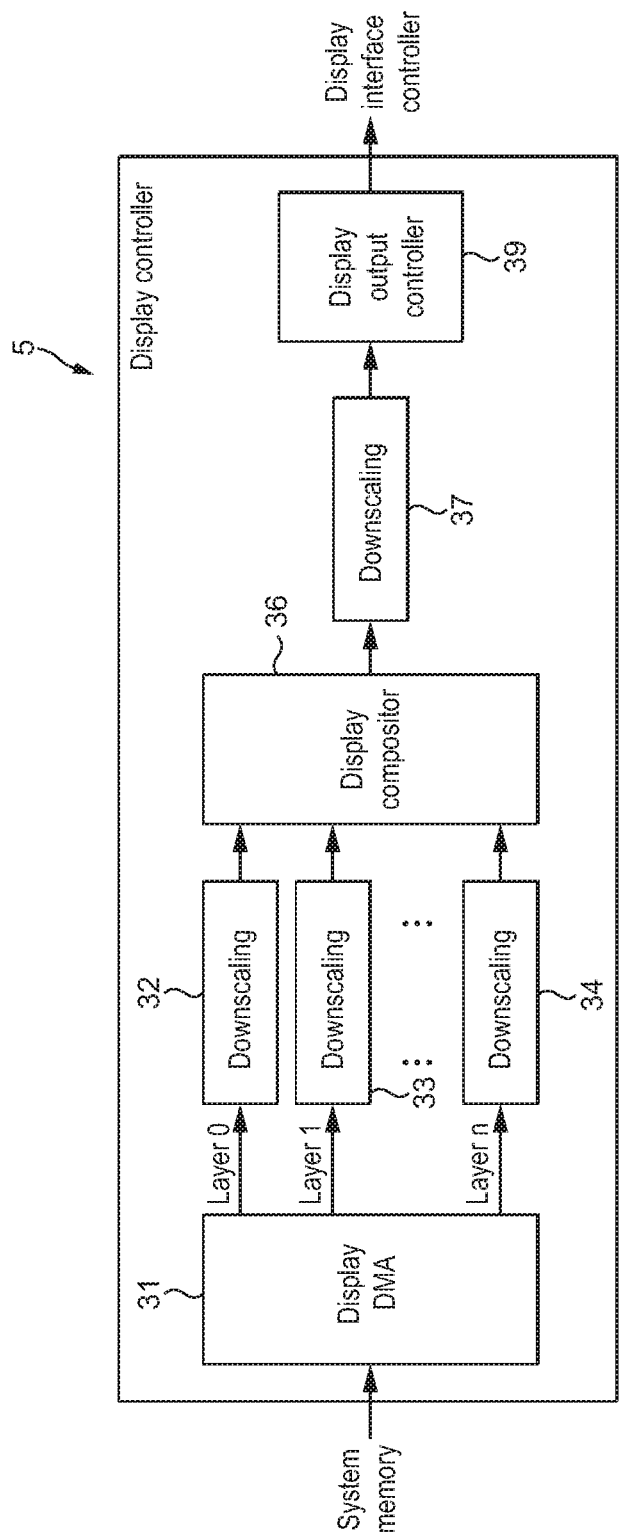
FIG. 4 shows schematically the scalers in a display controller in an embodiment of the technology described herein.

FIG. 4 illustrates this and shows schematically the scalers that are present in the display controller 5 of the data processing system. As shown in FIG. 4, in the present embodiment, the display controller 5 includes a scaler (a scaling engine) in each input layer pipeline 32, 33, 34 (for each input layer that it is able to receive and process), and also a scaler (a scaling engine) in the display processing pipeline 37 after the composition engine 36 that is operable to scale the composited input data arrays output by the composition engine 36 prior to their output for display.

Figure 5:
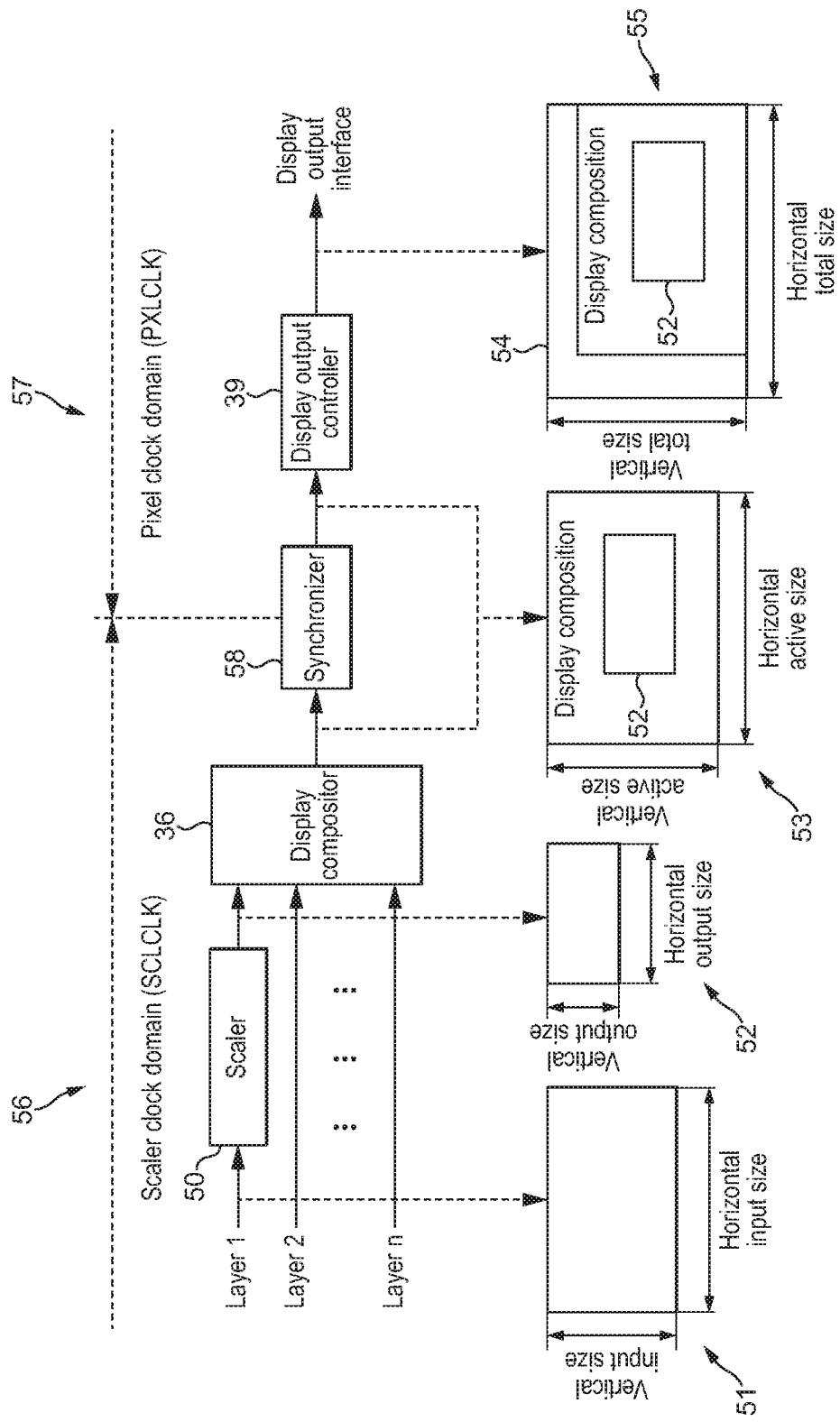
FIG. 5 shows schematically the scaling of an input data array in a display controller.

FIG. 5 shows in more detail the scaling operation of one of the layer pipelines in the display controller 5 when downscaling an input data array that is then composited into the overall output frame that is provided to the display 4 for display.

As shown in FIG. 5, the scaler 50 for the layer pipeline in question will receive an input data array 51 for scaling having a given vertical and horizontal size (in terms of the number of data positions in the horizontal and vertical directions) and, in the present example, downscale that input data array to provide an output downscaled version 52 of the input data array having a smaller vertical and horizontal size.

The composition engine 36 will then composite the downscaled input data array 52 from the layer pipeline appropriately into the composited output frame 53 that is to be displayed as shown in FIG. 5. There may then be some further processing to provide a blanking region 54 to provide the overall output frame 55 that is provided to the display for display.

Figure 6:
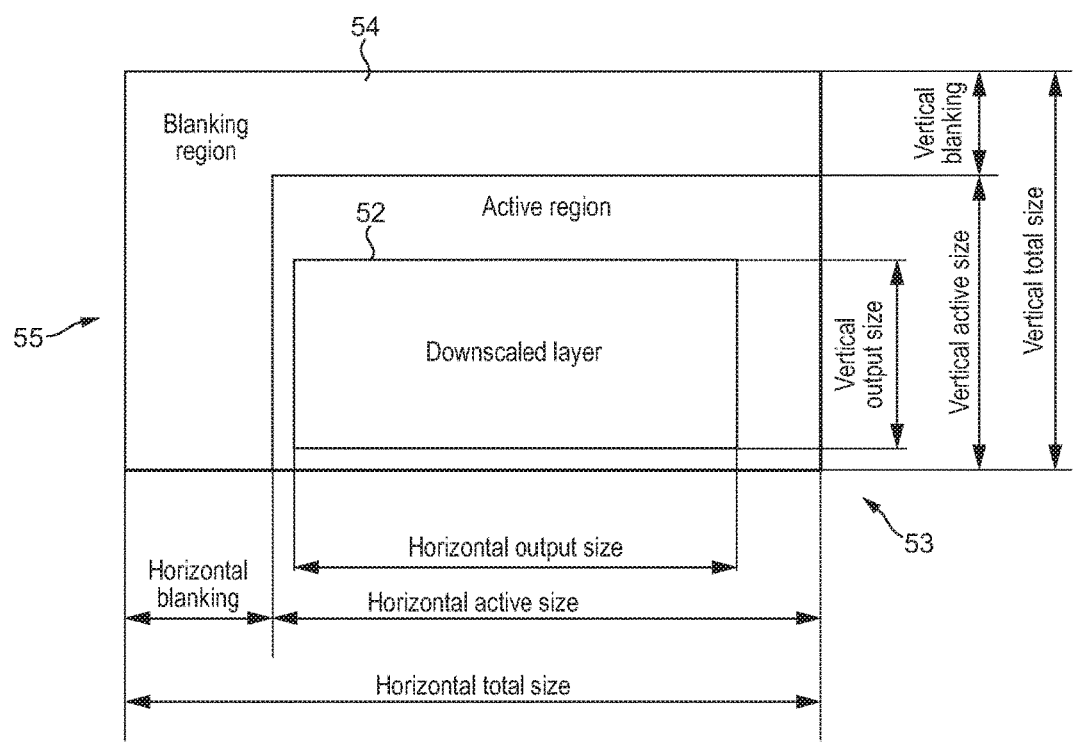
FIG. 6 shows an exemplary output frame for display in an embodiment of the technology described herein.

FIG. 6 shows in more detail the structure of the frame 55 that is sent through the display output interface of the display controller for display on the display 4. As shown in FIG. 6, the frame that is provided to the display includes the downscaled input layer (data array 52) in the active region which is the composited output frame 53, together with a blanking region 54. (The active region 53 corresponds to the set of clock cycles during which the display controller outputs pixels (one pixel per clock cycle). The blanking region 54 is the set of clock cycles during which the display controller does not send any output pixels for display.)

In this display controller operation, the output frame 55 that is provided to the display will need to be provided to the display 4 at a given rate to allow the display 4 to be updated and refreshed at the appropriate frequency (e.g. 30 or 60 frames per second). Correspondingly, the data positions in the downscaled input data array 52 must be generated at a frequency that meets the display timing requirements. In other words, the downscaling scaling operation 50 must be able to produce output data positions of the downscaled input frame 52 at a rate that allows the output display timing requirements to be met.

The effect of this is that because downscaling is being performed, such that more input data positions need to be input and processed to provide a given downscaled output data position (as discussed above), the scaling operation 50 must operate (at least in terms of its input processing) at a higher frequency than the required output frequency for the downscaled output frame 52.

To achieve this, as shown in FIG. 5, the input, scaling process 50 resides in one clock domain (a "scaler" clock domain) 56 (and is operable at one clock frequency), but the display output side of the process operates in a different clock domain (a "pixel" clock domain) 57 (and runs at a different frequency). If necessary, an appropriate synchroniser 58 is provided to interface between the two different clock domains, as shown in FIG. 5.

The Applicants have recognised in this regard that the frequency at which the downscaling operation will need to operate will be dependent upon the required display output frequency and the extent of the downscaling operation that is being performed (the level of downscaling that is to be performed on the input data array).

In particular, the minimum scaler clock frequency in the case where an input frame is being downscaled in both directions will depend upon the output (display output) clock frequency as follows:

$$f_{SCLCLK} \geq \frac{\text{h\_in\_size} \cdot \text{v\_in\_size}}{\text{h\_total\_size} \cdot \text{v\_out\_size}} \cdot f_{PXLCLK} \qquad \text{Equation 1}$$

where:
$f_{SCLCLK}$—frequency of scaler clock
$f_{PXLCLK}$—frequency of pixel (display output) clock
h_in_size—horizontal size of input content (to be scaled)
v_in_size—vertical size of input content (to be scaled)
h_total_size—total size of display timing line
v_out_size—vertical size of output content (scaled)

Correspondingly, in the case where there may be downscaling of an input data array in one direction and upscaling of the input data array in the other direction, the minimum scaler clock frequency will depend upon the display output clock frequency as follows:

$$f_{SCLCLK} \geq \frac{\max(\text{h\_in\_size}, \text{h\_out\_size}) \cdot \text{v\_in\_size} + \text{h\_out\_size} \cdot (\text{v\_out\_size} - \min(\text{v\_in\_size}, \text{v\_out\_size}))}{\text{h\_total\_size} \cdot \text{v\_out\_size}} \cdot f_{PXLCLK} \qquad \text{Equation 2}$$

where:
- $f_{SCLCLK}$—frequency of scaler clock
- $f_{PXLCLK}$—frequency of pixel (display output) clock
- h_in_size—horizontal size of input content (to be scaled)
- v_in_size—vertical size of input content (to be scaled)
- h_total_size—total size of display timing line
- h_out_size—horizontal size of output content (scaled)
- v_out_size—vertical size of output content (scaled)
- max(a, b)—the largest element from a and b
- min(a, b)—the smallest element from a and b Table 1 below shows the required scaler frequency for a given display output clock frequency for some exemplary (and typical) downscaling use cases.

TABLE 1

Examples of downscaling use cases

| Input resolution (H × V) | Output resolution (H × V) | Horizontal total size | Pixel clock frequency [MHz] | Required scaler frequency [MHz] |
|---|---|---|---|---|
| 3840 × 2160 | 1920 × 1080 | 2200 | 148.5 | 518.4 |
| 2560 × 1600 | 1920 × 1080 | 2200 | 148.5 | 256 |
| 2560 × 1440 | 1280 × 720 | 1664 | 74.5 | 229.2 |

As can be seen from this Table, for certain downscaling use cases the required scaler frequency can be very high.

The present embodiments address this by dividing an input data array (surface, layer) to be downscaled by the display controller 5 into plural equal (or similar) parts, and downscaling each such part using a different scaler of the display controller. In other words, the scaling operation for an input data array (surface) to be downscaled is distributed across plural scalers of the display controller.

As will be discussed further below, this then has the effect of being able to reduce the required clock frequency for the individual scalers, such that the downscaling operation may then be feasible even in those situations where an individual scaler could not perform the downscaling operation on its own because it could not be run at a high enough frequency. In particular, and as will be discussed further below, the scaling clock frequency that the plural scalers need to operate at to downscale the input data array corresponds to the clock frequency required if using one scaler to downscale the input surface divided by the number of scalers over which the downscaling operation is distributed. (For example, if downscaling from 3840×160 to 1290×1080 requires running a single scaler at 518 MHz, the same downscaling operation can be performed using two scalers operating at 259 MHz).

Figure 7:
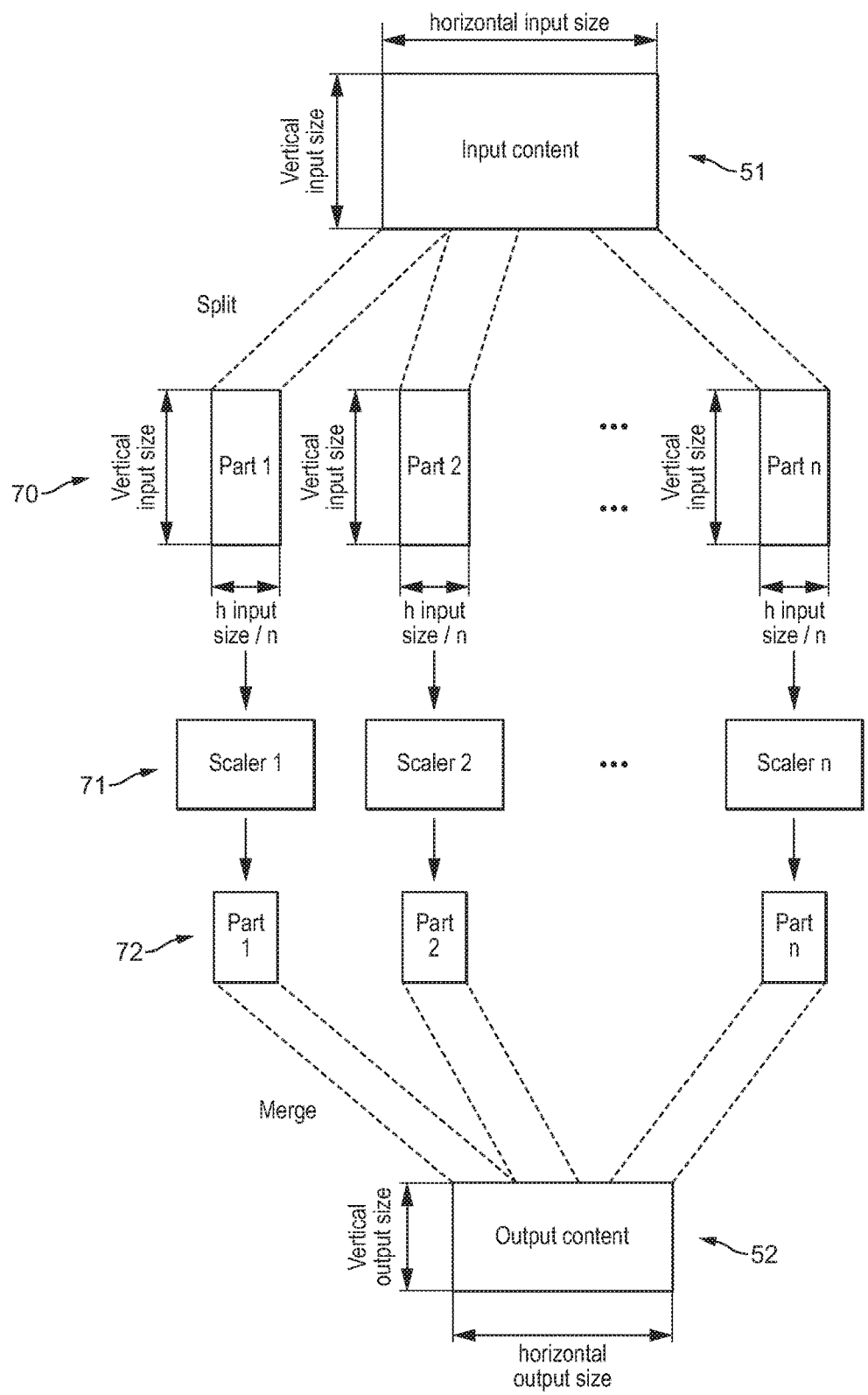
FIG. 7 shows schematically the downscaling of a data array in plural parts in an embodiment of the technology described herein.

FIG. 7 illustrates this operation and shows an exemplary input data array 51 to be downscaled being split into plural parts 70 along its horizontal extent, such that each part 70 that the input data array 51 to be downscaled is divided into has the same vertical size corresponding to the vertical size of the input data array 51, but has a horizontal size corresponding to the appropriate fraction of the overall horizontal size of the input data array 51.

As shown in FIG. 7, the different parts 70 of the input data array 51 are then provided to respective layer processing pipeline scalers 71 of the display controller 5 and are respectively downscaled by those scalers to provide a plurality of downscaled output parts 72. The plural downscaled output parts 72 are then combined (merged) to provide the desired downscaled output data array 52.

In the present embodiments, the operation shown in FIG. 7 is achieved by distributing the respective parts 70 of the output data array 52 to be downscaled to different layer pipelines 32, 33, 34 of the display controller 5, such that each part is treated, in effect, as a separate input layer and scaled appropriately. The scaled input parts are then merged to provide the downscaled output data array 52 in the composition stage 36 (by the compositor) of the display controller 5.

The splitting of the input data array 51 into different parts and the provision of those parts to different layer processing pipelines of the display controller can be achieved in any suitable and desired manner.

Figure 8:
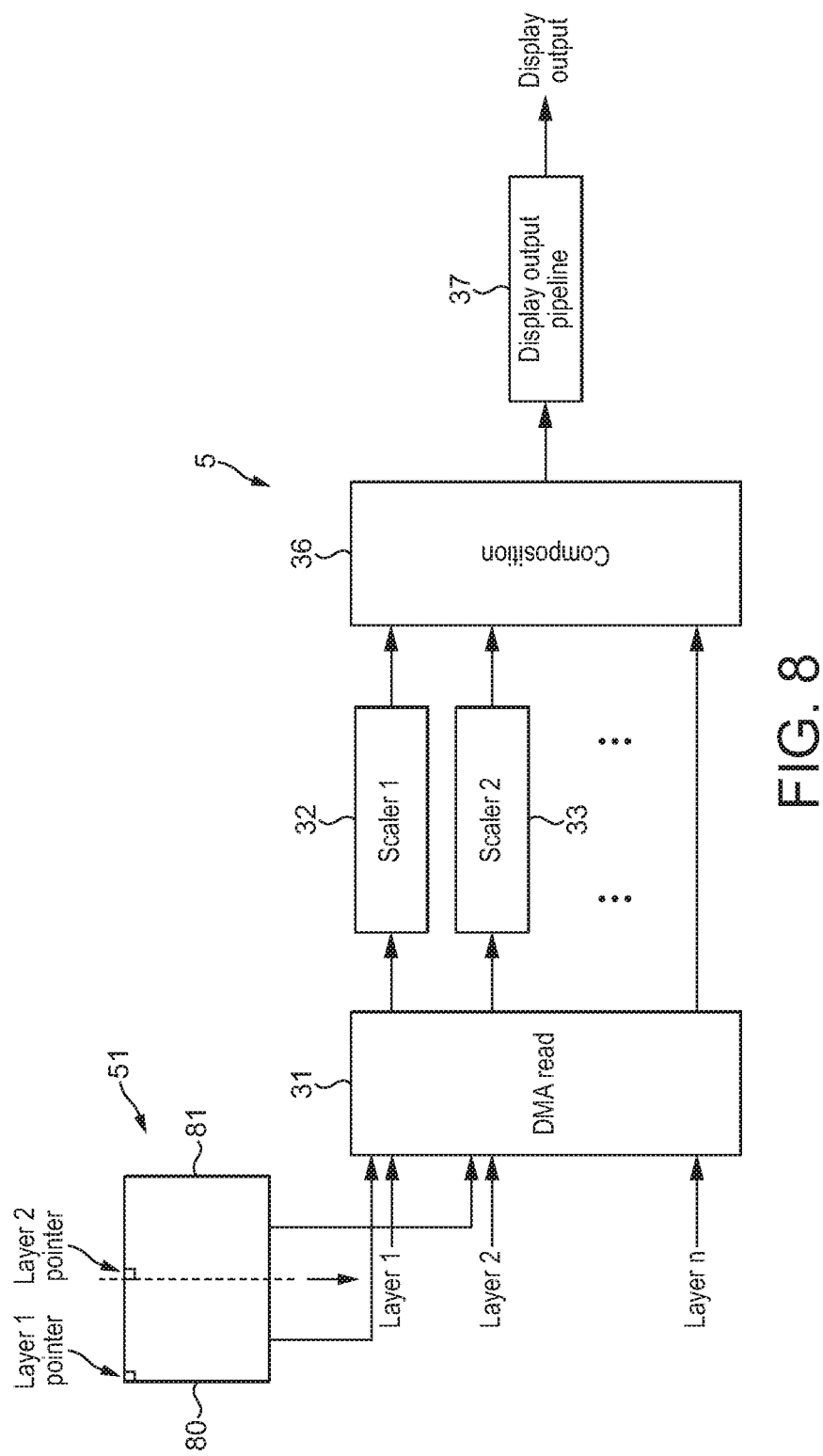
FIGS. 8 and 9 illustrate the provision of different parts of an input data array to be downscaled to respective scalers in embodiments of the technology described herein.

FIG. 8 shows one embodiment for providing different parts of an input data array 51 to be downscaled to respective layer processing pipelines 32, 33 of the display controller 5.

In this case, the different parts 80, 81 of the input data array 51 (which for simplicity is shown as being divided into two different parts only) is performed as part of the DMA read process for the input data array 51, with the input data array 51 to be downscaled being read into the display controller, as shown in FIG. 8, as two separate layers corresponding to the respective different parts 80, 81. This can be achieved, for example, through appropriate programming of the memory pointers and input sizes for each layer that is to be read into the display controller for processing.

As shown in FIG. 8, in this arrangement the DMA read unit 31 of the display controller 5 will accordingly read in the different parts 80, 81 of the input data array 51 to be downscaled as respective layers, which respective layers will then be processed (and in particular downscaled) by the appropriate layer processing pipeline of the display controller 5, with the downscaled layers then being appropriately composited by the composition engine 36 of the display controller to provide the overall downscaled output frame.

Figure 9:
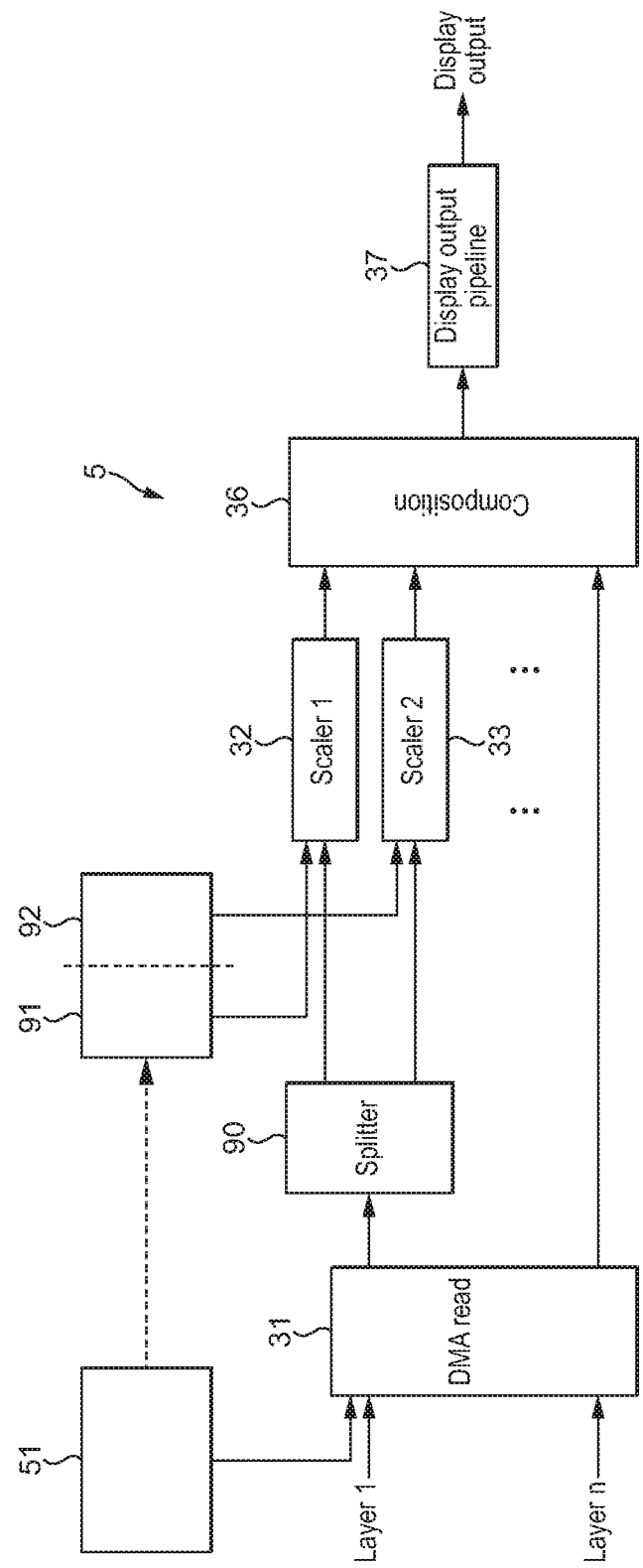

FIG. 9 shows an alternative embodiment in which the input data array 51 to be downscaled is read in as a single layer by the display controller 5, but there is then a splitting stage (a splitter) 90 after the memory read stage 31 that is operable to divide the read input layer 51 into the desired parts 91, 92, and to provide those parts appropriately to the different layer processing pipelines 32, 33 of the display controller. In this case, the memory read subsystem 31 of the display controller will need to deliver two input data array data positions per clock cycle to the splitter 90. (However, this would usually be possible, as one memory read (one memory word) that is read by the memory read subsystem 31 will typically include several data positions (e.g. one 128-bit memory word that may be read in a single clock cycle may comprise four 32-bit data positions).)

Other arrangements for dividing an input data array into plural parts and for providing the parts to respective, different scalers could, of course, be used if desired.

The effect of dividing an input data array to be downscaled into plural parts for the downscaling operation on the frequency that the scaling operation needs to operate at can be expressed as follows (using Equation 1 above-Equation 2 above can correspondingly be amended):

$$f_{SCLCLK} \geq \frac{\frac{h\_in\_size}{N} \cdot v\_in\_size}{h\_total\_size \cdot v\_out\_size} \cdot f_{PXLCLK} \quad \text{Equation 3}$$

$$f_{SCLCLK} \geq \frac{1}{N} \cdot \frac{h\_in\_size \cdot v\_in\_size}{h\_total\_size \cdot v\_out\_size} \cdot f_{PXLCLK}$$

where:
$f_{SCLCLK}$—frequency of scaler clock
$f_{PXLCLK}$—frequency of pixel (display output) clock
h_in_size—horizontal size of input content (to be scaled)
v_in_size—vertical size of input content (to be scaled)
h_total_size—total size of display timing line
v_out_size—vertical size of output content (scaled)
N—number of parts that the input data array is divided into (and thus the number of scalers is used for the downscaling operation)

It can be seen from this that increasing the number of scalers that are used to process an input data array correspondingly reduces the frequency at which each scaler needs to operate.

Table 2 below shows the corresponding frequency that is required when processing an input data array using two scalers for the example downscaling use cases indicated in Table 1 above.

TABLE 2

Examples of downscaling use cases

| Input resolution (H × V) | Output resolution (H × V) | Horizontal total size | Pixel clock frequency [MHz] | Required scaler frequency using one scaler [MHz] | Required scaler frequency using two scalers [MHz] |
|---|---|---|---|---|---|
| 3840 × 2160 | 1920 × 1080 | 2200 | 148.5 | 518.4 | 259.2 |
| 2560 × 1600 | 1920 × 1080 | 2200 | 148.5 | 256 | 128 |
| 2560 × 1440 | 1280 × 720 | 1664 | 74.5 | 229.2 | 114.6 |

It can be seen from this that the required scaler frequency when using two scalers is half the frequency that is required when using one scaler (for a given output clock frequency).

In the present embodiments, the number of parts to divide an input data array to be downscaled into, and correspondingly the number of scalers that are used to downscale the input data array in the display controller, is determined by the driver 10 for the display controller 5 when it commands the display controller to perform the necessary processing of the input data array(s) for output for display.

Figure 10:
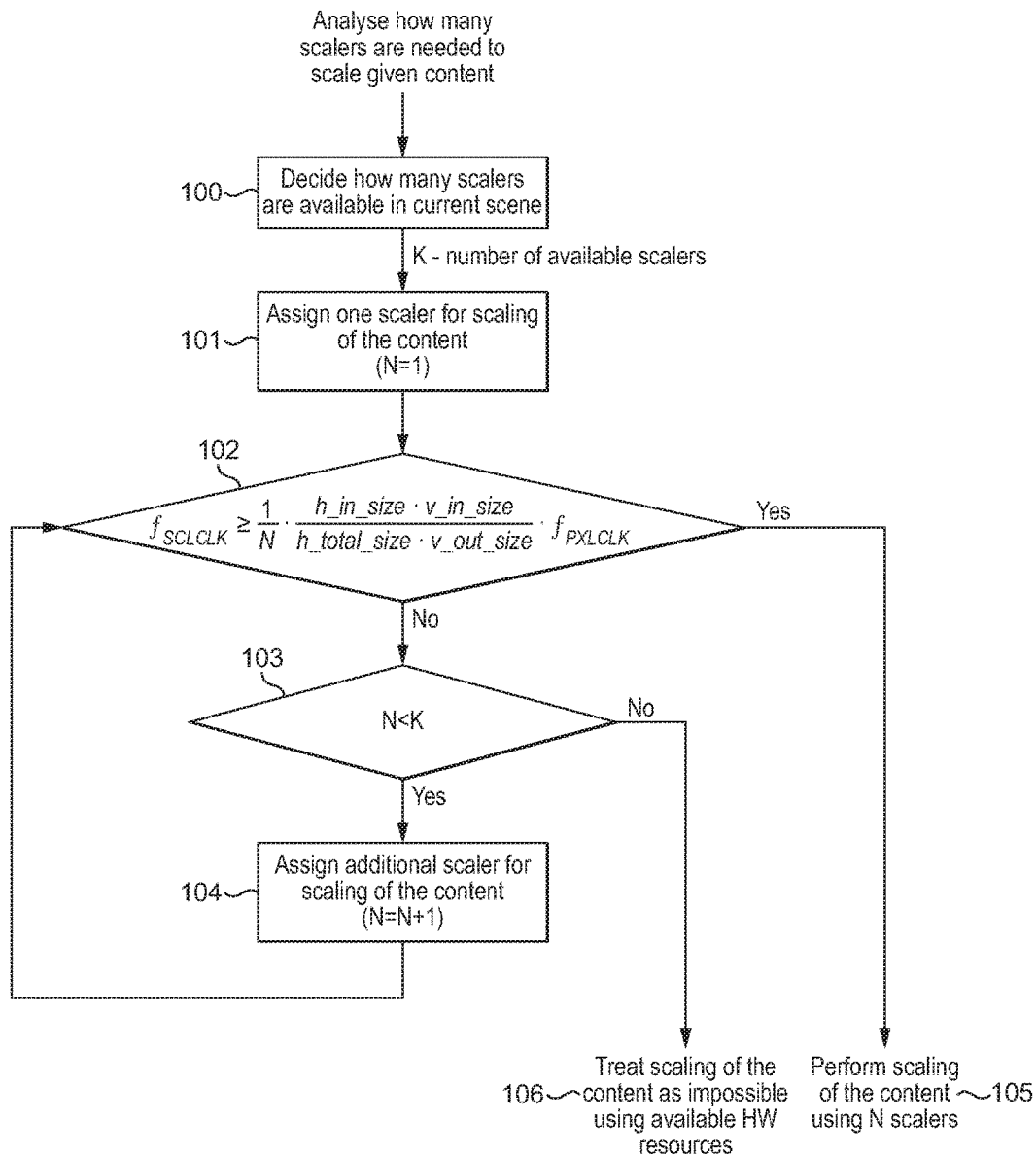
FIG. 10 is a flowchart showing the operation in an embodiment of the technology described herein.

FIG. 10 is a flowchart showing this operation of the driver 10 for determining how many scalers are needed to scale a given input data array to be downscaled.

As shown in FIG. 10, the process starts with the driver assessing how many scalers of the display controller are available for scaling the input data array in question (step 100). Where the input data array to be downscaled is the sole input data array to be used to provide the output data array, then all of the scalers in the input layer pipelines of the display controller are considered to be available for downscaling the input data array. However, it could be the case that the downscaled input data array is to be composited with other input data arrays to provide the overall output data array. In that case, one or more of the input layer processing pipelines (and the scalers) of the display controller may be required for processing other input data arrays. Thus there may be fewer input layer pipelines (and thus scalers) available for processing an input data array that is to be downscaled. The driver accordingly initially determines how many input layer processing pipelines and thus scalers of the display controller are available for processing the input data array in question for the current output frame being generated.

The driver then assigns one scaler (layer processing pipeline) for scaling the input data array (step 101) and determines using the equation discussed above the corresponding scaler clock frequency that would be required when using one scaler to downscale the input data array (step 102). If the determined required scaler clock frequency is less than or equal to a threshold scaler clock frequency value (step 102), then it is assumed that scaling of the input data array can be performed using a single scaler, and so the input data array is scaled using one scaler (step 105).

On the other hand, if at step 102 it is determined that the required scaling clock frequency is greater than the threshold value, it is then determined whether the total number of available scalers has been reached or not (step 103). If the total number of available scalers has been reached, then it is assumed that the input data array cannot be downscaled using the available hardware resources in the display controller and so some form of error or default operation is performed (step 106).

On the other hand, if at step 103 it is determined that the total number of available scalers has not yet been exceeded, then an additional scaler is assigned for the downscaling of the input data array (step 104), and the required scaler clock frequency when using that increased number of scalers is then determined and compared to the threshold scaler clock frequency (step 102).

This process is repeated until either a number of scalers that facilitate using the desired scaler clock frequency is determined, or it is determined that the input data array cannot be scaled using the available display controller hardware resources.

Other arrangements would, of course, be possible.

A number of variations, modifications and changes to the above-described embodiments would be possible, if desired.

For example, FIG. 7 shows the subdivision of the input data array 51 to be downscaled into non-overlapping parts. However, the Applicants have recognised that many scaling operations use windows (filters) that use adjacent data positions (e.g. a window or line of data positions) when scaling an input data array to provide an output data position.

Thus, in order to avoid scaling errors and artifacts at the adjoining edges of the different input data array parts, in an embodiment, the input data array parts that are sent to the respective scalers are configured so as to overlap (i.e. so as to share some data positions) at their adjoining edges. This will then allow the scaling operation when scaling the different parts to still produce the same result as if the input data array had simply been downscaled as a whole.

Figure 11:
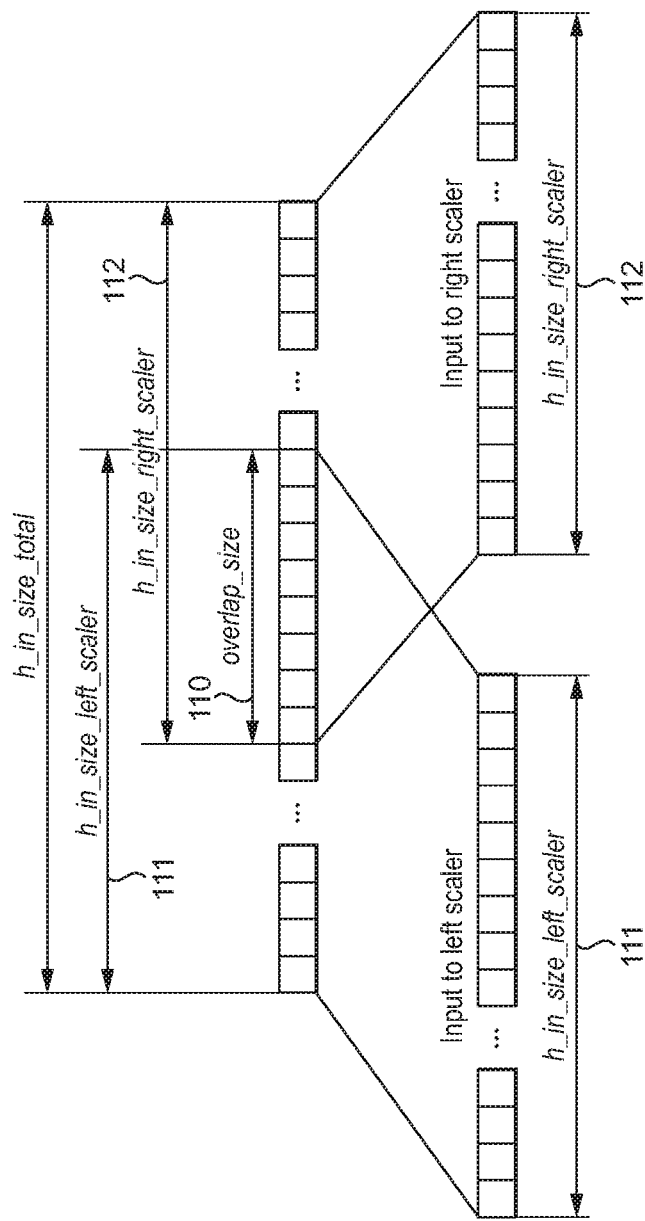
FIG. 11 shows the sub-division of a data array for downscaling in another embodiment of the technology described herein.

FIG. 11 illustrates this, and shows an exemplary overlap region 110 between left 111 and right 112 parts of an input data array to be downscaled so as to facilitate correct scaling of the edge positions along the adjoining border of the left and right parts of the input data array.

FIG. 11 shows this overlap for a single line of data positions in the input data array only for simplicity, but as will be appreciated by those skilled in the art, such an overlap is used for each horizontal line of the input data array that is being scaled.

Although in practice any such overlap is likely to be only a few (e.g. 4) data positions (and so should have little impact on the determination of the required scaler clock frequency in the manners discussed above), if desired the determination of the scaler clock frequency that will be required for a given downscaling operation and output clock frequency can be configured to also take account of the overlap region between the different parts of the input data array. In this case, the scaler clock frequency required when dividing an input data array into N parts (and thus using N scalers) can be determined as follows (using Equation 3 above as an example):

$$f_{SCLCLK} \geq \frac{\frac{h\_in\_size + (N-1) \cdot overlap\_size}{N} \cdot v\_in\_size}{h\_total\_size \cdot v\_out\_size} \cdot f_{PXLCLK}$$

$$f_{SCLCLK} \geq \frac{1}{N} \cdot \frac{(h\_in\_size + (N-1) \cdot overlap\_size) \cdot v\_in\_size}{h\_total\_size \cdot v\_out\_size} \cdot f_{PXLCLK}$$

Equation 4 where:
$f_{SCLCLK}$—frequency of scaler clock
$f_{PXLCLK}$—frequency of pixel (display output) clock
h_in_size—horizontal size of input content (to be scaled)
v_in_size—vertical size of input content (to be scaled)
h_total_size—total size of display timing line
v_out_size—vertical size of output content (scaled)
N—number of parts that the input data array is divided into (and thus the number of scalers is used for the downscaling operation)
overlap_size—number of overlapping data positions for each input data array part It can be seen from the above that embodiments of the technology described herein facilitate the performance of more demanding downscaling operations without the need for any or significant modification of a data processing system. Furthermore, the downscaling operation can be scaled in dependence on the number of available scalers for downscaling an input data array. It also provides better reuse of existing scaling resources.

This is achieved, in embodiments of the technology described herein, by dividing input data arrays to be scaled into plural parts and distributing the different parts of the input data arrays to different scalers of the data processing system for downscaling. The scaling resources of the data processing system can be dynamically allocated for downscaling a given input data array, e.g., and in an embodiment, on the basis of the required scaling clock frequency.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that includes two or more scalers, each scaler being operable to scale a received input data array to provide a scaled output version of the input data array, the method comprising:
when downscaling an input data array to provide an output data array corresponding to a downscaled version of the input data array:
the data processing system determining whether the input data array can be downscaled using a single scaler, or whether it should be downscaled using plural scalers, wherein the determining is based on an amount of downscaling that is required to produce a scaled output version of the input data array, wherein the amount of downscaling that is required is based on the relative sizes of the input data array and the output data array; and
when it is determined that plural scalers should be used, the data processing system:
providing a first part of the input data array to be downscaled to one of the scalers for downscaling;
providing a second part of the input data array to be downscaled to another one of the scalers for downscaling;
the scalers downscaling the respective parts of the input data array that they have received to provide respective downscaled versions of the parts of the input data array that they received for downscaling; and
combining the downscaled versions of the parts of the input data array from the scalers to provide an output data array corresponding to a downscaled version of the input data array.

2. The method of claim 1, wherein the scalers that are used to downscale the input data array comprise scalers of a particular processing unit of the data processing system.

3. The method of claim 1, wherein the input data array is divided into respective parts along its horizontal axis, such that the input data array is divided into plural vertical slices that together form the input data array.

4. The method of claim 1, wherein the parts that the input data array is divided into overlap along their adjoining edges.

5. The method of claim 1, comprising at least one of:
providing the separate parts of the input data array to the scalers by reading each part of the input data array separately from memory; and
combining the downscaled parts of the input data array output by the scalers to provide the downscaled output data array in a compositor of the data processing system.

6. The method of claim 1, comprising: wherein determining whether an input data array can be downscaled using a single scaler, or whether it should be downscaled using plural scalers is based on: the size of the input data array; the size of the output data array; and the frequency at which the output data array data is required to be produced for output.

7. The method of claim 1, comprising:
determining how many scalers are required to reduce the scaler operating frequency when downscaling a respective part of the input data array to less than or equal to a threshold scaler frequency, and then dividing the input data array into a number of parts corresponding to that number of scalers and providing the input data array parts to that number of scalers.

8. The method of claim 7, comprising determining the frequency at which each scaler will be required to operate based on at least one of: the size of each input data array part that a scaler will be required to downscale; the size of the output data array; and the frequency at which the output data array data is required to be produced for output.

9. The method of claim 1, further comprising:
first determining how many scalers are available for downscaling the input data array to be downscaled.

10. The method of claim 1, wherein the data processing system comprises a display controller, wherein the display controller comprises:
a memory read sub-system operable to fetch data of input surfaces to be processed by the display controller from memory;
input surface processing circuitry operable to process fetched data of input surfaces to provide one or more output surfaces, the input surface processing circuitry including plural scalers, each scaler operable to scale a received input surface to provide a scaled output version of the input surface; and
composition circuitry operable to composite output surfaces output by the input surface processing circuitry to provide a composited output surface;
wherein the input data array comprises an input surface and the output data array comprises an output surface, the method comprising:
when downscaling the input surface to provide the output surface corresponding to a downscaled version of the input surface:
determining whether the input data array can be downscaled using a single scaler, or whether it should be downscaled using plural scalers, wherein the determining is based on an amount of downscaling that is required to produce a scaled output version of the input data array, wherein the amount of downscaling that is required is based on the relative sizes of the input data array and the output data array; and
when it is determined that plural scalers should be used:
providing a first part of the input surface to be downscaled to one of the scalers of the input surface processing circuitry for downscaling;
providing a second part of the input surface to be downscaled to another one of the scalers of the input surface processing circuitry for downscaling;
the scalers downscaling the respective parts of the input surface that they receive to provide respective downscaled versions of the parts of the input surface that they received for downscaling; and
the composition circuitry combining the downscaled versions of the parts of the input surface from the scalers to provide an output surface corresponding to a downscaled version of the input surface.

11. A data processing system, the data processing system comprising:
two or more scalers, each scaler being operable to scale a received input data array to provide a scaled output version of the input data array;
the system further comprising:
processing circuitry configured to, when an input data array is to be downscaled to provide an output data array corresponding to a downscaled version of the input data array:
determine whether the input data array can be downscaled using a single scaler, or whether it should be downscaled using plural scalers, wherein the determination is based on an amount of downscaling that is required to produce a scaled output version of the input data array, wherein the amount of downscaling that is required is based on the relative sizes of the input data array and the output data array; and
wherein the processing circuitry is configured to, when it is determined that plural scalers should be used:
provide a first part of the input data array to be downscaled to one of the scalers for downscaling; and
provide a second part of the input data array to be downscaled to another one of the scalers for downscaling;
the scalers being configured to downscale the respective parts of the input data array that they receive to provide respective downscaled versions of the parts of the input data array that they received for downscaling; and
the system further comprising processing circuitry configured to:
combine the downscaled versions of the parts of the input data array from the scalers to provide an output data array corresponding to a downscaled version of the input data array.

12. The system of claim 11, comprising a compositor operable to composite two or more input data arrays to provide a composited output data array; and wherein:
the downscaled parts of the input data array output by the scalers to provide the downscaled output data array are combined in the compositor of the data processing system.

13. The system of claim 11, wherein the processing circuitry is configured to determine whether an input data array can be downscaled using a single scaler, or whether it should be downscaled using plural scalers, based on: the size of the input data array; the size of the output data array; and the frequency at which the output data array data is required to be produced for output.

14. The system of claim 11, wherein the processing circuitry configured to provide the parts of the input data array to different scalers, when an input data array is to be downscaled to provide an output data array corresponding to a downscaled version of the input data array, is further configured to:
determine how many scalers are required to reduce the scaler operating frequency when downscaling a respective part of the input data array to less than or equal to a threshold scaler frequency, and then divide the input data array into a number of parts corresponding to that number of scalers and provide the input data array parts to that number of scalers.

15. The system of claim 14, wherein the processing circuitry is configured to determine the frequency at which each scaler will be required to operate based on at least one of: the size of each input data array part that a scaler will be required to downscale; the size of the output data array, and the frequency at which the output data array data is required to be produced for output.

16. The system of claim 11, wherein the processing circuitry configured to provide the parts of the input data array to different scalers, when an input data array is to be downscaled to provide an output data array corresponding to a downscaled version of the input data array, is further configured to:
first determine how many scalers are available for downscaling the input data array to be downscaled.

17. A display controller for a data processing system, the display controller comprising:
- a memory read sub-system operable to fetch data of input surfaces to be processed by the display controller from memory;
- input surface processing circuitry operable to process fetched data of input surfaces to provide one or more output surfaces, the input surface processing circuitry including plural scalers, each scaler operable to scale a received input surface to provide a scaled output version of the input surface; and
- composition circuitry operable to composite output surfaces output by the input surface processing circuitry to provide a composited output surface;
- the display controller further comprising:
- processing circuitry operable to, when an input surface is to be downscaled to provide an output surface corresponding to a downscaled version of the input surface:
  - determine whether the input data array can be downscaled using a single scaler, or whether it should be downscaled using plural scalers, wherein the determination is based on an amount of downscaling that is required to produce a scaled output version of the input data array, wherein the amount of downscaling that is required is based on the relative sizes of the input data array and the output data array; and
  - wherein the processing circuitry is configured to, when it is determined that plural scalers should be used:
    - provide a first part of the input surface to be downscaled to one of the scalers of the input surface processing circuitry for downscaling;
    - provide a second part of the input surface to be downscaled to another one of the scalers of the input surface processing circuitry for downscaling;
  - the scalers being operable to downscale the respective parts of the input surface that they receive to provide respective downscaled versions of the parts of the input surface that they received for downscaling; and
  - the composition circuitry being operable to combine the downscaled versions of the parts of the input surface from the scalers to provide an output surface corresponding to a downscaled version of the input surface.

18. A non-transitory computer readable storage medium storing computer software code which when executing on a processor performs a method of operating a data processing system that includes two or more scalers, each scaler being operable to scale a received input data array to provide a scaled output version of the input data array, the method comprising:
- when downscaling an input data array to provide an output data array corresponding to a downscaled version of the input data array:
- determining whether the input data array can be downscaled using a single scaler, or whether it should be downscaled using plural scalers, wherein the determining is based on an amount of downscaling that is required to produce a scaled output version of the input data array, wherein the amount of downscaling that is required is based on the relative sizes of the input data array and the output data array; and
- when it is determined that plural scalers should be used:
- providing a first part of the input data array to be downscaled to one of the scalers for downscaling;
- providing a second part of the input data array to be downscaled to another one of the scalers for downscaling;
- the scalers downscaling the respective parts of the input data array that they have received to provide respective downscaled versions of the parts of the input data array that they received for downscaling; and
- combining the downscaled versions of the parts of the input data array from the scalers to provide an output data array corresponding to a downscaled version of the input data array.

* * * * *